United States Patent
Christodoulou

(10) Patent No.: US 9,415,397 B1
(45) Date of Patent: Aug. 16, 2016

(54) LAMELLA PLATES FOR A CLASSIFIER

(71) Applicant: FLSmidth A/S, Valby (DK)

(72) Inventor: Periklis Christodoulou, Forest Lake (AU)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/916,022

(22) PCT Filed: Sep. 18, 2013

(86) PCT No.: PCT/IB2013/058625
§ 371 (c)(1),
(2) Date: Mar. 2, 2016

(87) PCT Pub. No.: WO2015/040451
PCT Pub. Date: Mar. 26, 2015

(51) Int. Cl.
*B03B 5/66* (2006.01)
*B03B 5/62* (2006.01)

(52) U.S. Cl.
CPC .. *B03B 5/623* (2013.01); *B03B 5/66* (2013.01)

(58) Field of Classification Search
CPC .................................. B03B 5/66; B03B 5/263
USPC ......................................................... 209/157
See application file for complete search history.

(56) References Cited

U.S. PATENT DOCUMENTS

| 3,706,384 A | * | 12/1972 | Weijman-Hane | .. B01D 21/0045 210/519 |
| 4,889,624 A | * | 12/1989 | Soriente | ............ B01D 21/0045 210/232 |

FOREIGN PATENT DOCUMENTS

| WO | 0045959 | 8/2000 |
| WO | 2008064406 A1 | 6/2008 |

OTHER PUBLICATIONS

The International Search Report and Written Opinion dated Feb. 20, 2014, 8 pages.

* cited by examiner

*Primary Examiner* — Terrell Matthews
(74) *Attorney, Agent, or Firm* — Matthew R. Weaver; Jeffrey A. Sharp; Daniel DeJoseph

(57) ABSTRACT

Disclosed herein are lamella plates for a separator such as a reflux classifier or reflux flotation cell, where the lamella plates may include opposed upturned edges and a reinforcing bend. The reinforcing bend may be parallel to the opposed upturned edges. The opposed upturned edges may include a portion contacting another lamella plate in an array of lamella plates.

22 Claims, 8 Drawing Sheets

LAMELLA PLATES FOR A CLASSIFIER

TECHNICAL FIELD

This disclosure relates generally to a classifier. In particular, although not exclusively, this disclosure relates to lamella plates for a reflux classifier for separation of materials, such as ore particles, in mining and mineral processing.

BRIEF DESCRIPTION OF THE DRAWINGS

Non-Limiting and non-exhaustive embodiments of the disclosure are described, including various embodiments of the disclosure, with reference to the figures, in which.

DETAILED DESCRIPTION

Figure 1:
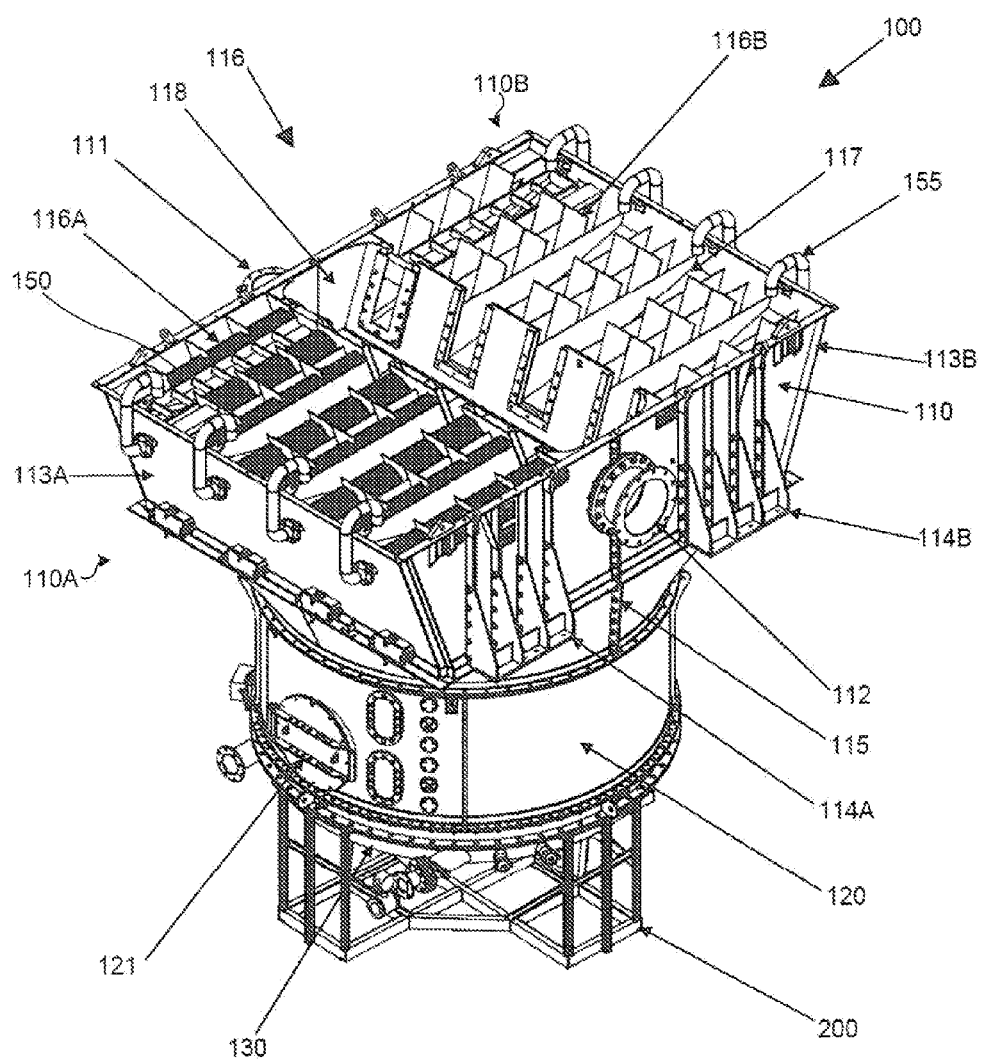
FIG. 1 illustrates a perspective view of a classifier according to one embodiment.

The present disclosure provides a classifier that may be used in the separation of materials, such as ore particles, in mining and mineral processing. Such classification of particles according to size and/or specific density is often used in mineral processing. In order to classify these particles it is common to locate the particles in a solution to form a slurry. This slurry is then passed through various types of equipment in order to separate the particles into different sizes and/or densities.

One of these types of equipment is a classifier that separates particles according to their size and/or density. Reflux classifiers typically have a slurry which is fluidized and passed through a plurality of parallel plates, or lamellae, which use gravity to separate solid particles from the liquid.

The spacing between lamella plates depends on what range of particle size is to be collected by the process. Typically, these particular separators are used to recover very fine particles from approximately 0.07 inches down to microns. Lamella plates should preferably have minimal thickness in order to maximize use of the available space (volume) for the separation process to occur. Such requirements for thin plates become especially important when very narrow spacing between the lamella plates is required (e.g. less than around 0.24 inches). This is because the volume of the plates takes away the available volume for separation processes to occur. In other words, as the spacings between lamella plates become smaller, it becomes more important to utilize thin lamella plates. The below table demonstrates the percentage of space taken away by lamella plates depending on relative spacings between the lamella plates and their thickness (wherein "Nr" is the number of lamella plates per 1 meter length of the separator at any width; and "Fraction" indicates the fraction of the available volume taken up by the lamella plates). In the case of 1 mm relative spacings, 2 mm or 1 mm thick plates would result in occupying 67% or 50% of the available volume for separation process to take place. As described hereinbelow, using roll forming process to make lamella plates with a small cross section area results in significantly increasing slurry throughput through the system. For example, 1 mm relative spacings may yield a 100% improvement.

| spacing | thickness | Nr | Fraction | thickness | Nr | Fraction | thickness | Nr | Fraction |
|---|---|---|---|---|---|---|---|---|---|
| 8 | 2 | 100 | 20% | 1 | 111 | 11% | 0.5 | 118 | 6% |
| 6 | 2 | 125 | 25% | 1 | 143 | 14% | 0.5 | 154 | 8% |
| 5 | 2 | 143 | 29% | 1 | 167 | 17% | 0.5 | 182 | 9% |
| 4 | 2 | 167 | 33% | 1 | 200 | 20% | 0.5 | 222 | 11% |
| 3 | 2 | 200 | 40% | 1 | 250 | 25% | 0.5 | 286 | 14% |
| 2 | 2 | 250 | 50% | 1 | 333 | 33% | 0.5 | 400 | 20% |
| 1 | 2 | 333 | 67% | 1 | 500 | 50% | 0.5 | 667 | 33% |

A reflux classifier or a reflux flotation cell may require many lamella plates to effectively make the intended separation of a high-throughput slurry. In some cases, a separator may include up to around 3300 (rc3000 takes 3328 plates) lamella plates or even more, representing around 2.5 miles of plates that are around 9.4 inches wide. Thus, decreasing cost to manufacture the lamella plates may greatly reduce cost of the separator.

Further, lamella plates are often manufactured from polycarbonate or polyvinylchloride (PVC) using extrusion and fabrication processes. To change a dimension of the lamella plates produced by such processes may require a major reconfiguration of the manufacturing process such as re-tooling. Thus, it may be desired to form lamella plates according to a process that can be easily changed to produce lamella plates of different dimensions. Further, use of such materials for lamella plates may require certain minimum dimensions of thickness for the plates to retain shape and strength in use (where the use may be in temperatures of up to around 212 F). Further still, it may be desired to use the lamella plates in a process that would cause corrosion thereto.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture, a method, or a product of a process.

The phrases "connected to" and "in communication with" refer to any form of interaction between two or more components, including mechanical, electrical, magnetic, and electromagnetic interaction. Two components may be connected to each other even though they are not in direct contact with each other and even though there may be intermediary devices between the two components.

In some cases, well-known features, structures, or operations are not shown or described in detail. Furthermore, the described features, structures, or operations may be combined in any suitable manner in one or more embodiments. The components of the embodiments, as generally described and illustrated in the figures herein, could be arranged and designed in a wide variety of different configurations. In addition, the steps of the described methods do not necessarily need to be executed in any specific order, or even sequentially, nor need the steps be executed only once, unless otherwise specified.

The embodiments of the disclosure are best understood by reference to the drawings, wherein like parts are designated by like numerals throughout. In the following description, numerous details are provided to give a thorough understanding of various embodiments; however, the embodiments disclosed herein can be practiced without one or more of the specific details, or with other methods, components, materials, and the like. In other instances, well-known structures, materials, or operations are not shown or described in detail to avoid obscuring aspects of this disclosure.

FIG. 1 illustrates a perspective view of a separator 100 according to one embodiment. Specifically, FIG. 1 illustrates a perspective view of a reflux classifier 100 according to one embodiment, where a cover thereof has been removed to show the lamella plates 150. It should be noted herein that although several embodiments are described in use in a reflux classifier, the lamella plates herein may be used in any device that uses lamella plates for separation. Such devices may include, for example, reflux classifiers, reflux flotation cells, settling tanks, clarifiers, and the like.

The reflux classifier 100 may be used to separate material, such as coal particles, on the basis of size and specific density. The reflux classifier 100 has a separation chamber in the form of a lamella chamber 110 located on top of a mixing chamber 120 which is located above a fluidizing chamber 130. The reflux classifier 100 is illustrated on a stand 200, which is typically removed after installation.

The lamella chamber 110 has an inlet 111 and an outlet 112 and is in fluid communication with the mixing chamber 120 and the fluidizing chamber 130. The lamella chamber 110 may include a plurality of separable parts. In the illustrated embodiments of the reflux classifier 100 the lamella chamber 110 is formed from two portions, namely, a first part 110A, having a first portion of a housing 113A and a second part 110B having a second portion of a housing 113B. Together the two portions 110A and 110B form a complete lamella chamber 110. Both the first and second portions of housing 113A and 113B have supports 114A and 114B, respectively, that can be used to mount the reflux classifier 100 to an external structure (not shown).

The first part 110A and second part 110B of the lamella chamber 110 each have a mounting system, in the form of corresponding flanges 115 (illustrated together in the figures), to affix the two portions together as shown. The flanges 115 each have a plurality of apertures (not shown) that receive fasteners in the form of nuts and bolts. The inlet 111 and outlet 112 are both located along the seam between the first part 110A and second part 110B of the lamella chamber 110 and can be used to further affix first part 110A and second part 110B of the lamella chamber 110 together for use. If the first part 110A and second part 110B of the lamella chamber 110 are not to be separated again after installation, more permanent methods of affixing may be utilized instead of, or as well as, flanges 115 with nuts and bolts.

The lamella chamber 110 has a series of plate arrays in the form of a plurality of lamella plates 116. The plurality of parallel plates 116 are split between the first part 110A and second part 110B of the lamella chamber 110 to form a first set of parallel plates 116A in the first part 110A and a second set of parallel plates 116B in the second part 110B. The parallel plates 116 are inclined relative to the axis of gravity to provide a classifying effect to material that passes through the plates 116.

A plurality of launders 117 are provided in each of the first part 110A and second part 110B of the lamella chamber 110 to catch particles located within the slurry after it has passed through the plurality of parallel plates 116. Each launder 117 has two substantially parallel side walls and an inclined base. The launders 117 are fluidly connected to a collector 118, which is located centrally between the first set of parallel plates 116A and the second set of parallel plates 116B. The collector 118 is generally 'V' shaped and receives material, such as coal slurry, once it has passed through the launders 117. The collector 118 is fluidly connected to the outlet 112, which enables processed material to exit the reflux classifier 100 from the collector 118.

The mixing chamber 120 has a hatch 121 that allows access therein for cleaning and maintenance, or the like. The fluidizing chamber 130, which keeps slurry in a fluid state, has an underflow valve. The underflow valve 131 is located adjacent the bottom of the fluidizing chamber 130 for removal of heavier particles and solids.

The lamella chamber 110 is mounted to the mixing chamber 120 by way of flanges with nuts and bolts. This allows the lamella chamber 110 to be separated from the mixing chamber 120. The same applies between the mixing chamber 120 and the fluidizing chamber 130, which allows the reflux classifier 100 to be broken down into smaller pieces for transportation, or the like.

Figure 2A:
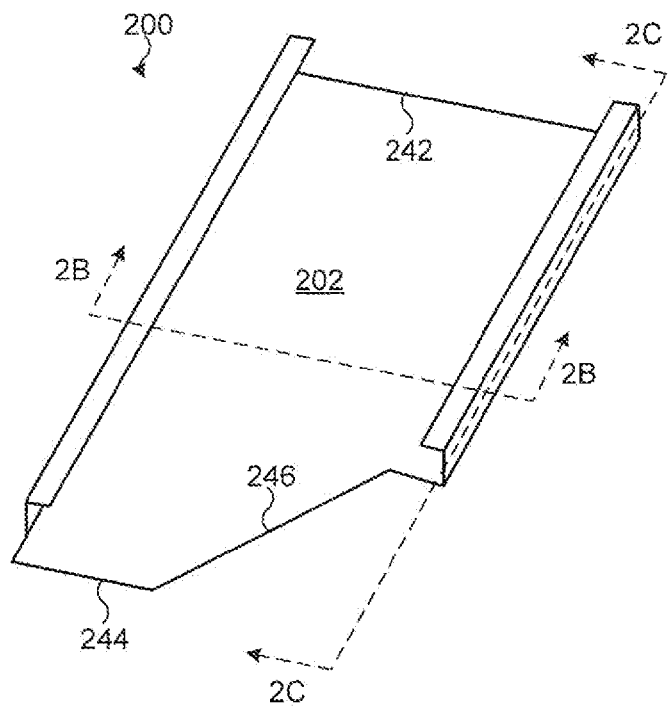
FIG. 2A illustrates a perspective view of a lamella plate according to one embodiment.
Figure 2B:
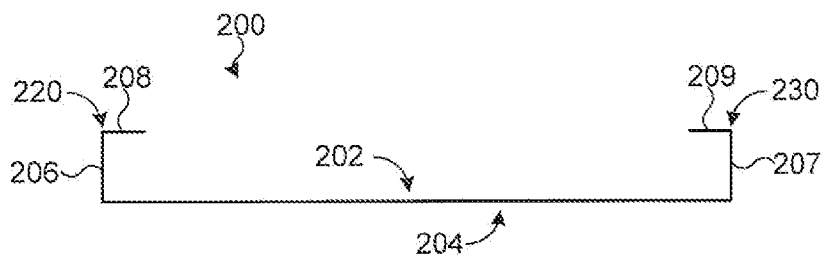
FIG. 2B illustrates a cross-sectional view of a lamella plate according to the embodiment illustrated in FIG. 2A.
Figure 2C:
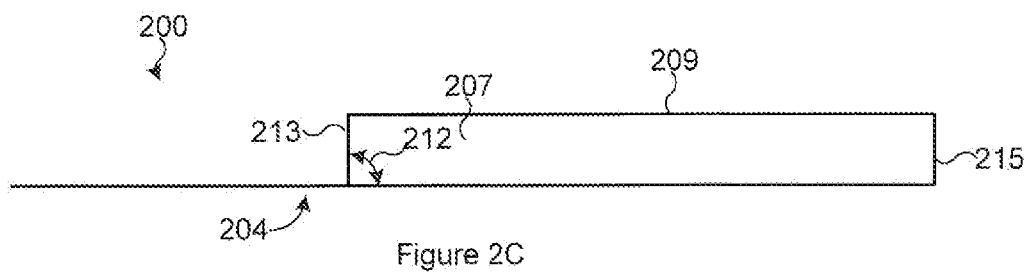
FIG. 2C illustrates a side view of a lamella plate according to one embodiment.

FIGS. 2A-2C illustrate views of a lamella plate according to one embodiment of the present disclosure that may be used in a separator such as the classifier of FIG. 1. In particular, FIG. 2A illustrates a perspective view of a lamella plate 200, FIG. 2B illustrates a cross-sectional view of the lamella plate, and FIG. 2C illustrates a side view of the lamella plate. Turning first to FIGS. 2A-2C, illustrated is a lamella plate 200 for use in a separator such as a reflux classifier or reflux flotation cell. The lamella plate includes a contacting surface 202 for contacting a slurry. In operation, larger particles, higher-density particles, or solid particles (depending on the application) settle onto the contacting surface 202 of the lamella plates, and flow in a substantially downward direction, whereas smaller particles, lower-density particles, or liquids (depending on the application) settle more slowly and may not settle on the contacting surface at all, but are instead swept in a substantially upward direction, hence facilitating separation. The smaller or lower-density particles or liquid may contact a flow surface 204 of an adjacent lamella plate in its travel in a direction substantially opposite that of the larger particles, higher-density particles or solid particles. Thus, each lamella plate may include a slurry contacting surface 202 for contacting a slurry and a flow surface 204 opposite the slurry contacting surface 202 that, in use, may contact the separated flow.

Lamella plates 200 may include a pair of opposed upturned edges 220 and 230, that are upturned in a direction of the contacting surface 202. As further illustrated in FIG. 2D, the pair of opposed upturned edges may be used to separate the lamella plate from an adjacent lamella plate, to create a separation space 252 defined by the contacting surface 202 of the lamella plate, the pair of opposed upturned edges 220, 230, and the flow surface (lower surface) of an adjacent lamella plate.

The pair of opposed upturned edges 220, 230 may include a first portion 206, 207 extending in a direction of the contacting surface 202 (toward an adjacent lamella plate). In one embodiment, the first portions 206, 207 may be substantially perpendicular to the slurry contacting surface 202. The pair of opposed upturned edges 220, 230 may include a plate contacting surfaces 208, 209 extending in a direction substantially parallel to the slurry contacting surface 202. When the lamella plate 200 is part of an array of lamella plates 250, the plate contacting surfaces 208, 209 may contact a flow surface 204 of an adjacent plate 200. Hence, a separate frame or separate guides are not required in the formation of an array 250 of lamella plates.

Lamella plate 200 may include a flow rate increasing edge 246 configured to increase a flow rate of the fluid flow as the fluid flows toward the end 244 of the lamella plate 200. In operation, fluid may flow from edge 242 toward edge 244 of the lamella plate, while solids may settle toward slurry contacting surface 202 and flow toward end 242 of the lamella plate 200. It may be desired to speed up the flow rate of the fluid flow at the outlet to ensure that no recirculation of the so far separated particles occurs. Thus, lamella plate 200 may include edge 246 to allow covering this section's side of the lamella plate with a surface which decreases the flow cross section area of the opening, and thus increasing a fluid flow rate at the end 244 of the lamella plate 202. A block of polyurethane may be used to seal this side of the plates, such block is often referred to as a crawder.

FIG. 2C illustrates a side view of the lamella plate of FIGS. 2A and 2B from the perspective of line 2C of FIG. 2A. As illustrated, the third portion 207 includes a first side 213 and a second side 215 that are angled at an angle 212 from the slurry contact surface 202. Angle 212 may be a right angle. Angle 212 may be acute to the slurry contact surface 202 at a top end of the lamella plate, and obtuse to the slurry contact surface 202 at a bottom end of the lamella plate. When installed in a separator, an array of lamella plates 250 may be configured such that the slurry contacting surface 202 is not in a vertical configuration, but instead the slurry contacting surface 202 may be angled obtuse to the horizontal (with the flow surface 204 acute to the horizontal) such that particles falling vertically contact the contacting surface 202 and flow down such surface toward the bottom of the lamella plate 202. Thus, an angle between the flow surface and the horizontal may be acute. Such angle 212 may allow for a planar configuration of the top and bottom of array 250 of lamella plates.

Figure 2D:
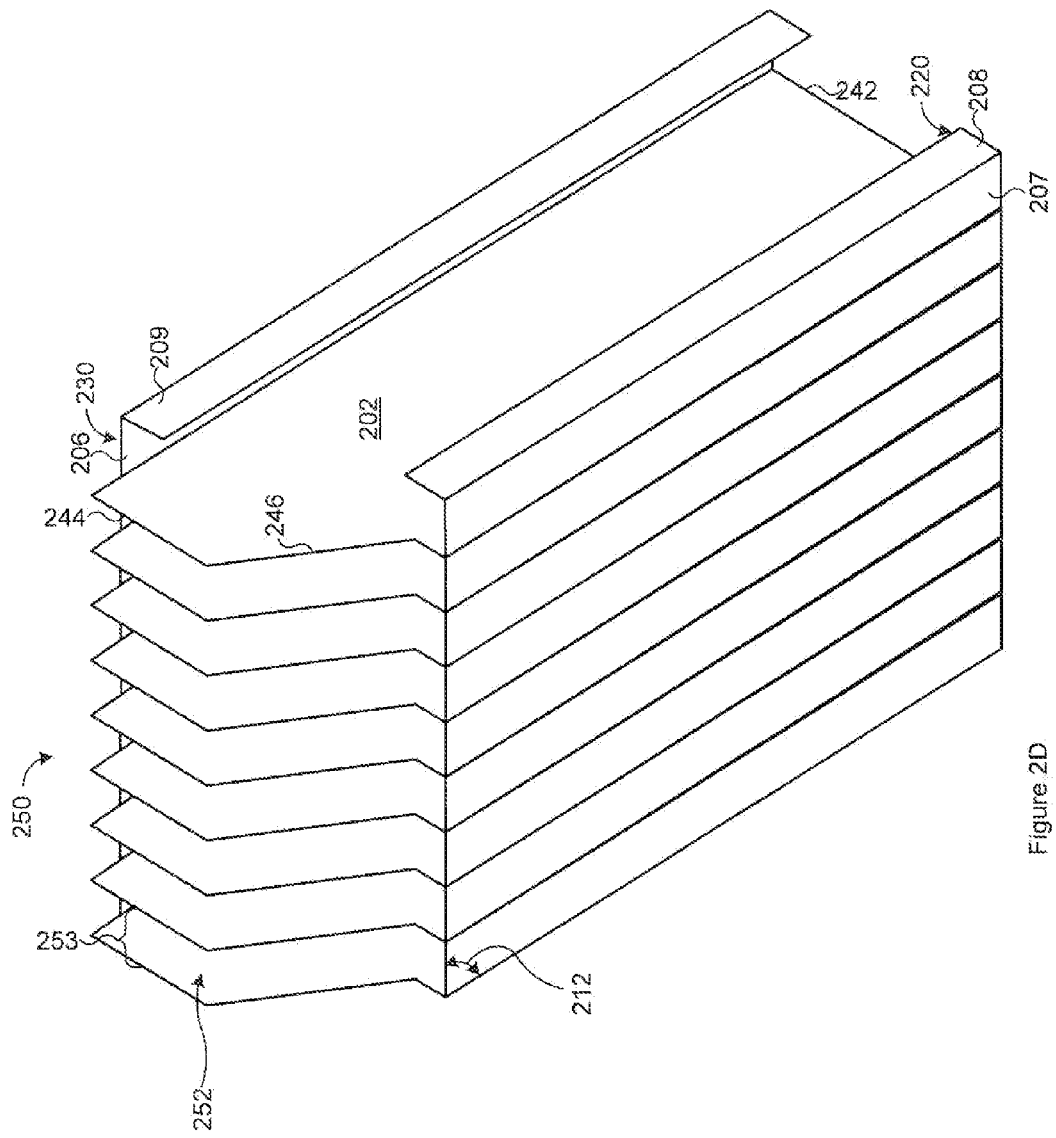
FIG. 2D illustrates a perspective view of an array of lamella plates according to the embodiments of FIGS. 2A and 2B.

FIG. 2D illustrates an array 250 of lamella plates such as the lamella plates 200 illustrated in FIGS. 2A-2C. As briefly described above, separation spaces such as separation space 252 are formed between adjacent lamella plates 200. Such separation spaces 252 are defined by the opposing upturned edges 220, 230, flow surface 204 and slurry contacting surface 202. Separation spaces 252 may be open on two opposing sides to allow for flow into and out of the array 250 of lamella plates.

It may be desirable to increase the number of lamella plates 200 in an array 250. The rate of separation is a function of the cross section area of the lamella plates. For a given space, a reduction in the cross section of the lamella plates would make it possible to locate more plates, resulting in a higher rate of separation. Furthermore, a reduction in thickness of each lamella plate would make it possible to locate more plates in the same space, also resulting in a higher rate of separation. According to the several embodiments herein, the space between the plates is controlled by controlling the heights of the opposing upturned edges 220, 230. That is, by controlling the depth 206, 207 of opposing upturned edges 220, 230, the spacing between plates may be controlled. Thus, the space between the plates 253 may be controlled. Due to the opposing upturned edges 220, 230, no additional frames or structure are necessary to properly space the plates. In one embodiment herein, the space between plates 253 may be less than around 0.1 inches. In one particular embodiment, the space between plates 253 may be around 0.08 inches. It is understood that the minimum spacing between plates may be as small as the thickness of the plates themselves, as the opposing upturned edges may be simply folded back onto the plate. Thus, for a plate of around 0.019 inches thick, the space between plates may be as low as 0.019 inches.

Figure 3A:
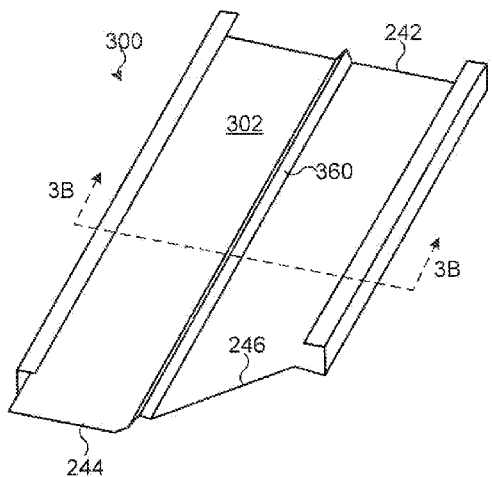
FIG. 3A illustrates a perspective view of a lamella plate according to one embodiment.
Figure 3B:
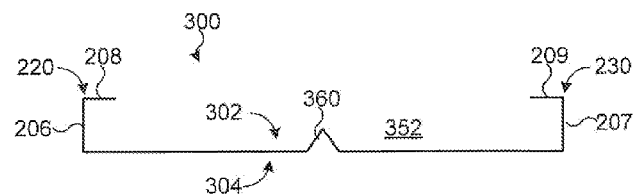
FIG. 3B illustrates a cross-sectional view of a lamella plate according to the embodiment illustrated in FIG. 3A.
Figure 3C:
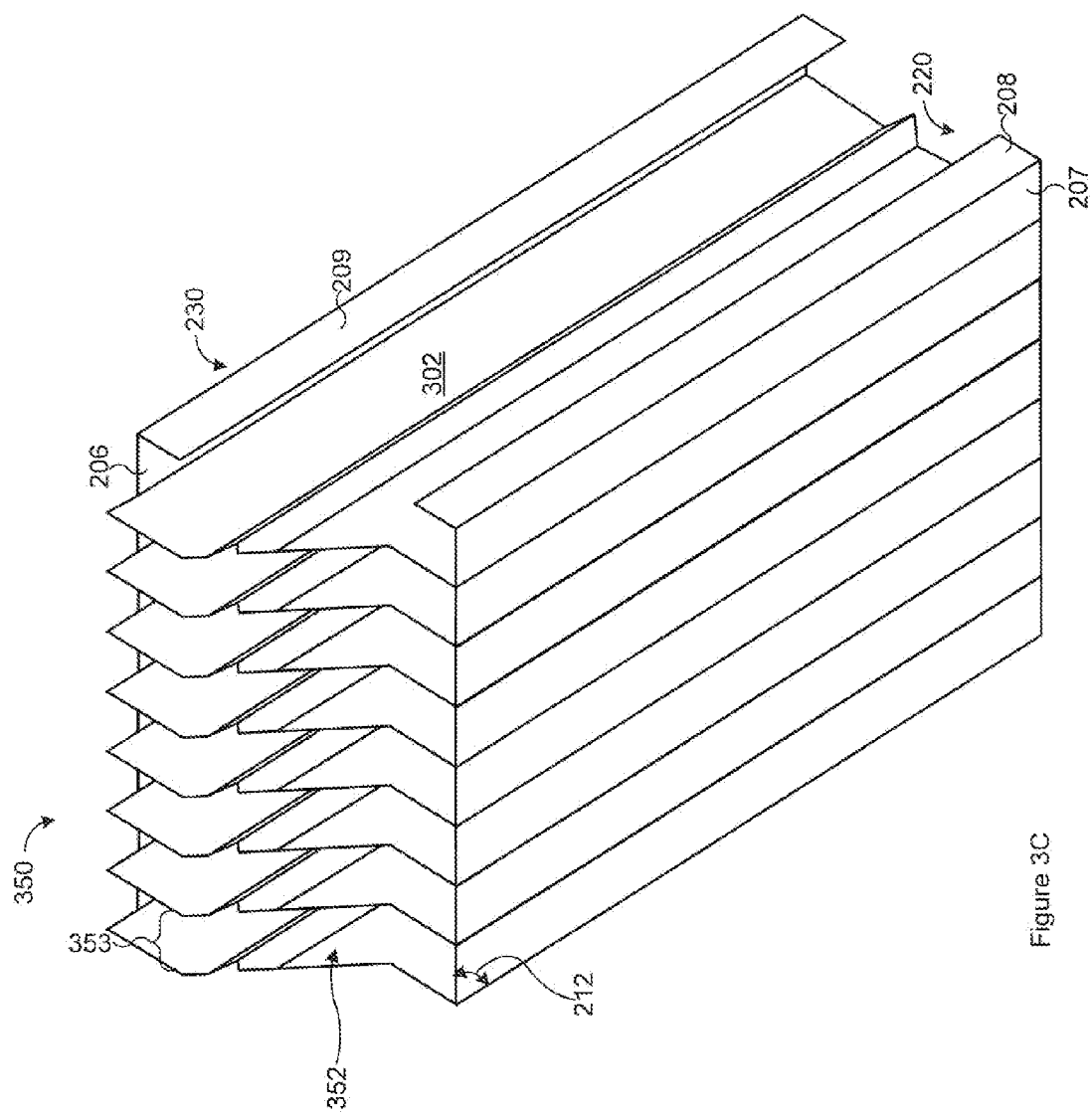
FIG. 3C illustrates a perspective view of an array of lamella plates according to the embodiments of FIGS. 3A and 3B.

FIGS. 3A-3C illustrate a lamella plate 300 and an array 350 of lamella plates according to another embodiment of this disclosure. As with the lamella plate illustrated according to FIGS. 2A-2C, lamella plate 300 includes a slurry contacting surface 302 and a flow surface 304, along with two opposing upturned edges 220, 230. Lamella plate 300 further includes a reinforcing bend 360. Reinforcing bend 360 may be substantially parallel with the opposing upturned edges 220, 230. Lamella plate 300 may include more than one reinforcing bend, although only a single reinforcing bend is shown.

FIG. 3B illustrates a cross-sectional view of the lamella plate 300 of FIG. 3A. Reinforcing bend 360 extends around half way into the separation space 352. That is, a height of the reinforcing bend 360 may be around half of the height of pair of opposed upturned edges 220, 230, or half of the separation space 353 (as shown in FIG. 3C). In another embodiment, a height of the reinforcing bend 360 may be greater than or less than half of the height of the opposed upturned edges 220, 230. In yet another embodiment, the reinforcing bend may extend downward instead of upward into the separation space 352.

FIG. 3C illustrates a perspective view of an array 350 of lamella plates such as the lamella plate 300 illustrated in FIGS. 3A and 3B. As described above, separation spaces such as separation space 352 are formed between adjacent lamella plates 300. Such separation spaces 352 are defined by the opposing upturned edges 220, 230, flow surface 304, and slurry contacting surface 302. Separation spaces 352 may be open on two opposing sides to allow for flow into and out of the array 350 of lamella plates.

Reinforcing bend 360 may add strength to the lamella plate 300. As discussed above, lamella plates may be formed from materials that require a predetermined amount of thickness in order to maintain shape when in use. Indeed, lamella plates formed from polycarbonate or PVC may require thicknesses of greater than around 0.04 inches to around 0.06 inches to withstand the forces typically applied when in use. However, lamella plate 300 with the reinforcing bend 360 may be able to withstand the same forces even with a thickness of less than around 0.01 inches to around 0.03 inches. In one embodiment, lamella plate 300 with reinforcing bend 360 may have a thickness of around 0.02 inches.

Figure 4A:
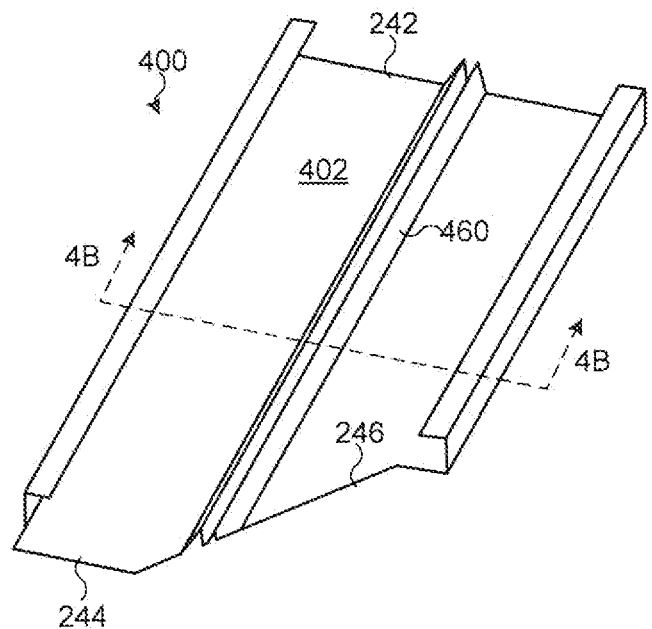
FIG. 4A illustrates a perspective view of a lamella plate according to one embodiment.
Figure 4B:
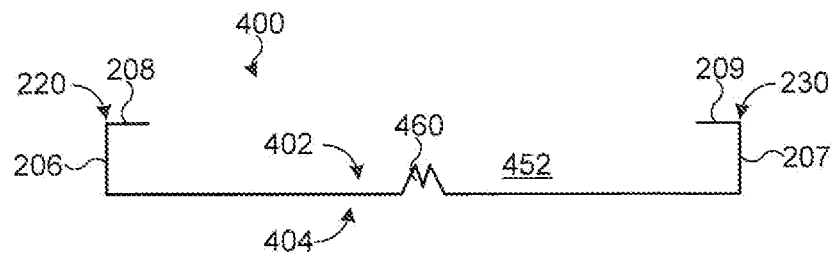
FIG. 4B illustrates a cross-sectional view of a lamella plate according to according to the embodiment illustrated in FIG. 4A.

FIGS. 4A and 4B illustrate another embodiment of a lamella plate 400 according to the present disclosure. FIG. 4A illustrates a perspective view of the lamella plate 400 including a slurry contacting surface 402 and a reinforcing bend 460. FIG. 4B illustrates a cross-sectional view of the lamella plate 400 including the slurry contacting surface 402, flow surface 404, and the reinforcing bend 460. According to this illustrated embodiment, the reinforcing bend includes a cross-sectional "M" shape, whereas the reinforcing bend according to the embodiments illustrated in FIG. 3A-3C includes a cross-sectional "V" shape. It should be noted that the reinforcing bend may have one of many possible cross-sectional shapes. According to several embodiments, the reinforcing bend may include one or more bends that are substantially parallel to the opposing upturned edges.

Figure 5A:
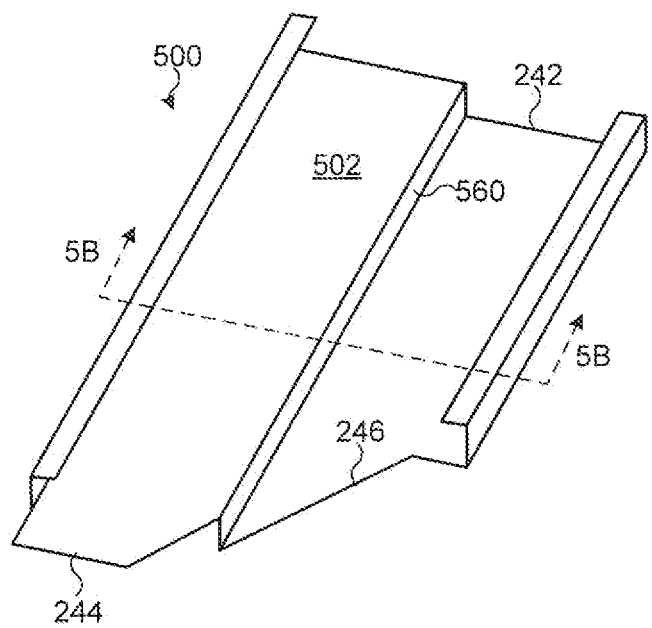
FIG. 5A illustrates a perspective view of a lamella plate according to one embodiment.
Figure 5B:
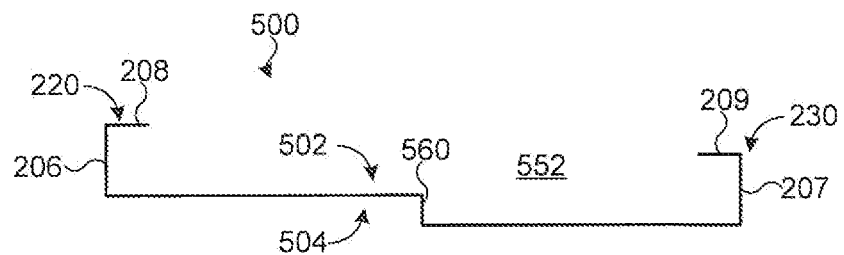
FIG. 5B illustrates a cross-sectional view of a lamella plate according to the embodiment illustrated in FIG. 5A.
Figure 5C:
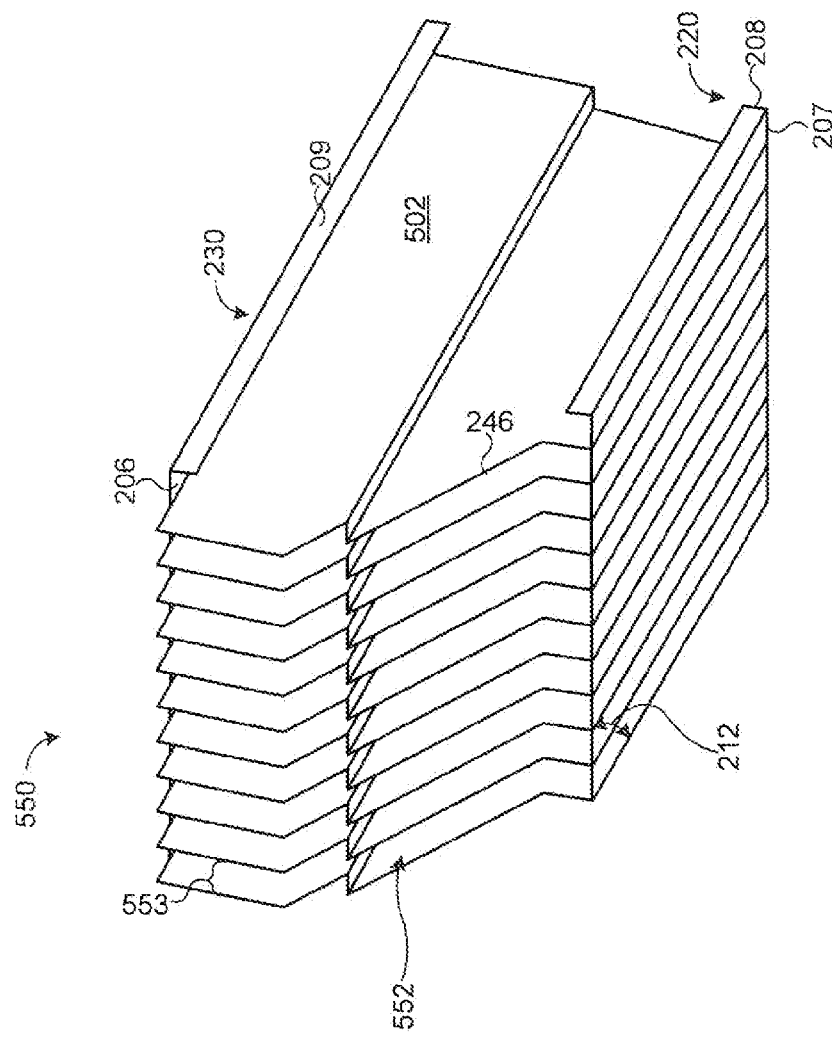
FIG. 5C illustrates a perspective view of an array of lamella plates according to the embodiment illustrated in FIGS. 5A and 5B.

FIGS. 5A-5C illustrate yet another embodiment of lamella plates 500 according to the description herein. FIG. 5A illustrates a perspective view of a lamella plate 500 that includes a slurry-contacting surface 502 and a reinforcing bend 560. FIG. 5B illustrates a cross-sectional vies of the lamella plate 500 illustrated in FIG. 5A. Lamella plate 500 includes a slurry-contacting surface 502, a flow surface 504, opposing upturned edges 220, 230, and reinforcing bend 560. The reinforcing bend 560 according to the embodiment illustrated in FIGS. 5A-5C includes a cross-sectional "L" shape, resulting in two different levels of contacting surface.

FIG. 5C illustrates a perspective view of an array 550 of lamella plates such as lamella plates 500 as illustrated in FIGS. 5A and 5B. As briefly described above, separation spaces such as separation space 552 are formed between adjacent lamella plates 500. Such separation spaces 552 are defined by the opposing upturned edges 220, 230, flow surface 504 and slurry contacting surface 502. Separation spaces 552 may be open on two opposing sides to allow for flow into and out of the array 250 of lamella plates. Lamella plates 500 may be separated by a separation space 553.

The lamella plates herein described may be formed from a material that may be readily shaped into the lamella plates disclosed herein. Furthermore, the lamella plates herein described may be formed from a material appropriate for use in temperatures of up to around 212 F. In one particular embodiment, lamella plates herein described may be formed from steel such as 304 stainless steel. Lamella plates herein described may be formed from steel, stainless steel, iron, copper, aluminum, titanium, brass, bronze, zinc, and the like, including alloys thereof.

In several embodiments, the lamella plates herein described may be formed from a material that allows for bulk manufacturing of such lamella plates. Lamella plates herein described may be formed from a sheet of material by continuous bending. Such continuous bending may be by roll forming.

Lamella plates formed by continuous bending may allow for a less-expensive production of lamella plates. Furthermore, such continuous forming allows for manufacture of lamella plates using a material that is stronger than polycarbonate or PVC while retaining a lower thickness than polycarbonate or PVC. Thus, according to one embodiment, lamella plates are formed from a material that allows for continuous bending such as steel, stainless steel, iron, copper, aluminum, titanium, brass, bronze, zinc, and the like, including alloys thereof.

Continuous bending may further be used to implement a reinforcing bend such as those described herein. Thus, according to one embodiment, disclosed are lamella plates formed by continuous bending and including a reinforcing bend. The continuous bend may have a further benefit of maintaining strength of the lamella plates with a lower thickness than plates without a reinforcing bend.

The invention claimed is:

1. A separator comprising:
    a separation chamber;
    a plurality of inclined parallel plates of the separation chamber, wherein each plate of the plurality of inclined parallel plates includes:
    a contacting surface for contacting the slurry;
    a lower surface opposite the contacting surface; and,
    a pair of opposed upturned edges upturned in a direction of the contacting surface, the pair of opposed upturned edges forming a settling space, and in contact with the lower surface of another plate of the plurality of inclined parallel plates forming a separation space defined by the contacting surface, the pair of opposed upturned edges, and the lower surface of the another plate.

2. The separator of claim 1, wherein each plate of the plurality of inclined parallel plates includes a reinforcing bend in a direction of a flow of the slurry.

3. The separator of claim 2, wherein the reinforcing bend comprises parallel with the pair of opposed upturned edges.

4. The separator of claim 2, wherein the reinforcing bend is in the contacting surface.

5. The separator of claim 2, wherein the reinforcing bend comprises a V shape.

6. The separator of claim 2, wherein the reinforcing bend comprises an L shape.

7. The separator of claim 2, wherein the reinforcing bend comprises an M shape.

8. The separator of claim 1, wherein a space between the contacting surface of one inclined parallel plate and the lower surface of the another inclined plate comprises less than 0.08 inches.

9. The separator of claim 1, wherein each plate of the plurality of inclined parallel plates are formed from steel.

10. The separator of claim 1, wherein each plate of the plurality of inclined plates comprises a thickness of less than 0.02 inches.

11. The separator of claim 1, wherein each upturned edge comprises a first portion extending toward the another plate, and a second portion contacting the another plate.

12. The separator of claim 1, wherein each upturned edge comprises a third portion extending back toward the plate.

13. The separator of claim 1, wherein the separator comprises a reflux classifier.

14. The separator of claim 1, wherein the separator comprises a reflux flotation cell.

15. The separator of claim 1, wherein the inclined parallel plates of the plurality of inclined plates comprise formed by roll forming.

16. The separator of claim 1, wherein the inclined parallel plates of the plurality of inclined plates comprise stainless steel.

17. An array of inclined parallel plates for use in a separation chamber of a separator, comprising:
    a first plate that includes a contacting surface for contacting a slurry and a lower surface opposite the contacting surface;
    a second plate that includes:
    a contacting surface for contacting the slurry;
    a lower surface opposite the contacting surface;
    a pair of opposed upturned edges upturned in a direction of the lower surface of the first plate, the upturned edges in contact with the lower surface of the first plate;
    a separation space defined by the contacting surface of the second plate, the lower surface of the first plate, and the pair of upturned edges of the second plate.

18. The array of claim 17, wherein the second plate further comprise a reinforcing bend in a direction of flow of the slurry.

19. The array of claim 18, wherein the reinforcing bend comprises parallel with the pair of opposed upturned edges.

20. The array of claim 17, wherein a space between the contacting surface of the second plate and the lower surface of the first plate comprises greater than 0.019 inches.

21. The array of claim 17, wherein the first and second plate comprise thicknesses of less than 0.02 inches.

22. The array of claim 17, wherein each upturned edge comprises a first portion extending toward the first plate, and a second portion contacting the first plate.

\* \* \* \* \*